United States Patent
Ikonomov et al.

(10) Patent No.: US 9,352,438 B2
(45) Date of Patent: May 31, 2016

(54) BALANCED ABRADING TOOL AND METHODS FOR ABRADING

(75) Inventors: Metodi L. Ikonomov, Clermont-Ferrand (FR); Cesar E. Zarak, Simpsonville, SC (US); Adib T. Chebli, Greer, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 14/008,288

(22) PCT Filed: Mar. 31, 2011

(86) PCT No.: PCT/US2011/030844
§ 371 (c)(1),
(2), (4) Date: Sep. 27, 2013

(87) PCT Pub. No.: WO2012/134489
PCT Pub. Date: Oct. 4, 2012

(65) Prior Publication Data
US 2014/0017979 A1    Jan. 16, 2014

(51) Int. Cl.
*B24B 5/36* (2006.01)
*B24B 49/16* (2006.01)
(Continued)

(52) U.S. Cl.
CPC . *B24B 5/366* (2013.01); *B24B 5/40* (2013.01); *B24B 19/02* (2013.01); *B24B 23/024* (2013.01);
(Continued)

(58) Field of Classification Search
CPC .......... B24B 5/185; B24B 5/366; B24B 5/40; B24B 19/02; B24B 23/00; B24B 23/02; B24B 27/0076; B24B 49/006; B24B 49/16; B24B 49/165; B24B 51/00; B24B 23/024
See application file for complete search history.

(56) References Cited

U.S. PATENT DOCUMENTS 907,058 A * 12/1908 Kraemer et al. ........ B24B 7/188
451/135
1,569,490 A   1/1926 Hiscock
(Continued)

FOREIGN PATENT DOCUMENTS

| CN | 1706629 A | 12/2005 |
|---|---|---|
| CN | 101045285 A | 10/2007 |

(Continued)

OTHER PUBLICATIONS

Tire Repair for Passenger Car and Light Truck Tires, Continental Tire Product Service Information Bulletin PSIB 05-01, Nov. 17, 2005, 2 pages, Continental Tire North America PLT Replacement Business Unit Customer Service.

(Continued)

*Primary Examiner* — Timothy V Eley
(74) *Attorney, Agent, or Firm* — Hahn Loeser & Parks LLP; Bret A. Hrivnak

(57) ABSTRACT

Exemplary embodiments of the subject invention comprise methods and apparatus concerning balanced abrading of a tire surface by an abrading tool. Such an abrading tool may comprise a pair of counter-rotating, driven abrading members, each of the abrading members having a rotational axis generally extending laterally across the tool, the abrading members being spaced apart in a lateral direction of the tool by a desired distance, each of the abrading members having an abrading surface defined by at least one outer diameter, the abrading surface extending axially relative to the rotational axis of the abrading member, wherein each of the abrading has a shaft upon which each abrading member is arranged, each of the shafts being adapted to be driven by a driving source. The tool further includes a body to which each shaft and abrading member is attached.

19 Claims, 6 Drawing Sheets

(51) Int. Cl.
  *B24B 5/40* (2006.01)
  *B24B 23/02* (2006.01)
  *B24B 27/00* (2006.01)
  *B24B 19/02* (2006.01)
  *B24B 51/00* (2006.01)
  *B29C 73/26* (2006.01)
  *B29C 73/10* (2006.01)
  *B29L 30/00* (2006.01)

(52) U.S. Cl.
  CPC ........... *B24B 27/0076* (2013.01); *B24B 49/165* (2013.01); *B24B 51/00* (2013.01); *B29C 73/26* (2013.01); *B29C 73/10* (2013.01); *B29C 2073/264* (2013.01); *B29L 2030/00* (2013.01)

(56) References Cited

U.S. PATENT DOCUMENTS

| | | | |
|---|---|---|---|
| 1,591,813 A | | 7/1926 | Frengle |
| 2,000,300 A | | 5/1935 | Scruby |
| 3,190,338 A | | 6/1965 | Wolfe |
| 3,421,411 A | | 1/1969 | Lowry et al. |
| 3,521,408 A | | 7/1970 | Neugebauer |
| 3,850,222 A | | 11/1974 | Lejuene |
| 3,860,050 A | | 1/1975 | Banks et al. |
| 3,932,965 A | * | 1/1976 | Kline, Jr. ................. 451/58 |
| 4,057,898 A | | 11/1977 | Piosky |
| 4,139,041 A | * | 2/1979 | Newton ................. 157/13 |
| 4,168,730 A | | 9/1979 | Keller |
| 4,230,164 A | | 10/1980 | Mericle |
| 4,435,456 A | | 3/1984 | Hausch |
| 4,479,523 A | | 10/1984 | Peterson et al. |
| 4,620,407 A | | 11/1986 | Schmid |
| 4,705,436 A | | 11/1987 | Robertson |
| 4,736,546 A | | 4/1988 | Ugo |
| 4,757,566 A | | 7/1988 | Field et al. |
| 4,817,697 A | | 4/1989 | Takami et al. |
| 5,115,870 A | | 5/1992 | Byrne |
| 5,445,691 A | | 8/1995 | Nakayama et al. |
| 5,540,210 A | | 7/1996 | Jones |
| 5,697,833 A | | 12/1997 | Hislop |
| 6,015,105 A | | 1/2000 | Brewer |
| 6,062,950 A | * | 5/2000 | Morgan ................. 451/28 |
| 6,129,611 A | | 10/2000 | Yamaguchi |
| 6,450,864 B1 | * | 9/2002 | Smith ................. 451/48 |
| 6,461,135 B1 | | 10/2002 | Lagnier et al. |
| 6,620,030 B1 | | 9/2003 | Delmoro et al. |
| 6,875,080 B2 | | 4/2005 | Gast, Jr. et al. |
| 8,231,428 B2 | * | 7/2012 | Poling et al. ................. 451/5 |
| 8,298,040 B2 | * | 10/2012 | De Gradi ................. 451/5 |
| 8,662,134 B2 | * | 3/2014 | Lindsay et al. ................. 157/13 |
| 2002/0066190 A1 | | 6/2002 | Fey et al. |
| 2002/0095810 A1 | | 7/2002 | Carlson et al. |
| 2003/0010802 A1 | | 1/2003 | Blaimschein et al. |
| 2005/0081972 A1 | | 4/2005 | Lopez |
| 2005/0200087 A1 | | 9/2005 | Vasudeva et al. |
| 2005/0236069 A1 | | 10/2005 | O'Brien |
| 2008/0005947 A1 | | 1/2008 | Barna |
| 2009/0001642 A1 | | 1/2009 | Bolton |
| 2009/0170405 A1 | | 7/2009 | Barusta |
| 2010/0143060 A1 | | 6/2010 | Weber et al. |
| 2011/0034108 A1 | | 2/2011 | Poling, Sr. et al. |
| 2011/0277898 A1 | | 11/2011 | Barraud et al. |

FOREIGN PATENT DOCUMENTS

| | | |
|---|---|---|
| CN | 101148020 A | 3/2008 |
| DE | 3926946 A1 | 1/1991 |
| DE | 4442553 A1 | 11/1994 |
| FR | 1211507 A | 3/1960 |
| JP | 2006346886 A | 12/2006 |
| RU | 10634 U1 | 8/1999 |
| RU | 2176954 C1 | 12/2001 |
| SU | 44448 A1 | 11/1942 |
| SU | 380436 | 11/1972 |
| SU | 1659223 A1 | 6/1991 |
| WO | 2009157941 A1 | 12/2009 |
| WO | 2012057806 A1 | 5/2012 |

OTHER PUBLICATIONS

A Shipwright in Training: Hundredths of an inch in wood and metal, retrieved on Dec. 12, 2014 from http://daviddanielsdesign.com/boatblog/index.php/page6/, 46 pages.

Tom's Workbench: Changing dovetail width with a fixed jig, retrieved on Dec. 22, 2014 from http://tomsworkbench.com/2010/04/05/changing-dovetail-width-with-a-fixed-jig/, 5 pages.

Sculpted Rocking Chair: Shaping the Seat, retrieved on Dec. 12, 2014 from http://thecraftsmanspath.com/2009/03/30/sculpted-rocking-chair-shaping-the-seat/, 11 pages.

Harper, Sam, Me making a violin, retrieved on Dec. 12, 2014 from http://poorfolkbows.com/violin4.htm, 18 pages.

PCT/US2011/030844 International Search Report and Written Opinion dated Jun. 1, 2011.

* cited by examiner

BALANCED ABRADING TOOL AND METHODS FOR ABRADING

This application is a National Stage application of International Application No. PCT/US2011/30844, filed Mar. 31, 2011, to which this application claims priority and the benefit of, the disclosure of which is also hereby incorporated by reference.

BACKGROUND OF THE INVENTION

1. Field of the Invention

This invention relates generally to methods and apparatus for abrading a surface of a tire, and in particular instances, abrading a surface of a tire in preparation for tire repair and patch application.

2. Description of the Related Art

It is commonly known to abrade a surface of a tire to remove desired material there from. For example, abrading operations may be performed along the tire tread, such as to improve tire performance or to prepare the tire for retreading. Tire performance may be improved, for example, by improving conicity. In performing retreading operations, abrading operations are performed to generally remove a substantial portion of the pre-existing tread to prepare the tire carcass for receipt of a new tread.

By further example, it is known to abrade an interior tire surface in preparation for applying a tire patch to repair a damaged portion of a tire. In preparing the tire for receiving a tire patch, the corresponding surface of the tire is prepared to improve patch adhesion and to provide a desired arrangement relative to the tire. In certain instances, the surface is simply cleaned and/or roughened to improve adhesion. In other instances, it is desirous to remove sufficient material from the tire to form a recessed area for receiving a tire patch. This area is referred to as a patch receiving area. In removing material for forming the patch receiving area, it is often desirous to control the removal of the material to ensure that a particular depth is achieved. For example, it may be desirous to ensure that any reinforcements (i.e., fabric, cords, strand, or the like) are not damaged by the removal process. Further, it may be desirous to reach a particular depth to expose a certain layer or material, or to otherwise simply reach any other desired depth.

Presently when performing abrading operations according to manual methods, an operator freely utilizes an unconstrained abrading tool to remove material from the tire. In performing such operations, the operator must not only control the position of the tool in all directions along the surface, but must also monitor the continued removal of such material to achieve a desired depth. To further complicate matters in either manual or automatic applications when using an abrading device having two rotating abrading members, an operator may endure additional strain when having to translate the abrading tool across a tire surface while both abrading members rotate in the same direction to resist such translation. Accordingly, there is a need to better control the abrading of a tire and the forces acting on the abrading tool.

SUMMARY OF THE INVENTION

Particular embodiments of the present invention include improved methods and apparatus for performing abrading operations. Particular embodiments of such apparatus include an abrading device including a pair of counter-rotating, driven abrading members, each of the abrading members having a rotational axis generally extending laterally across the device, the abrading members being spaced apart in a lateral direction of the device by a desired distance, each of the abrading members having an annular abrading surface. Such apparatus may further provide that each of the abrading members are adapted to be driven in opposing rotational directions by a driving source.

Particular embodiments of the invention include a method for abrading a surface of a tire. Such methods may include the step of providing a tire having: a pair of beads spaced axially along a rotational axis of the tire; an outer exposed surface extending between each pair of beads, the outer or external exposed surface including a tread surface extending annularly about the rotational axis of the tire; and, an inner or interior exposed surface extending between each pair of beads and annularly about the rotational axis of the tire, the inner exposed surface being spaced from the outer surface by a thickness of the tire. Such methods may further include the step of providing an abrading device comprising: a pair of counter-rotating, driven abrading members, each of the abrading members having a rotational axis generally extending laterally across the device, the abrading members being spaced apart in a lateral direction of the device by a desired distance, each of the abrading members having an annular abrading surface; each of the abrading members being adapted to be driven in opposing rotational directions by a driving source. Still further, such methods may include the step of abrading material from a surface of the tire using the abrading device.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Figure 1:
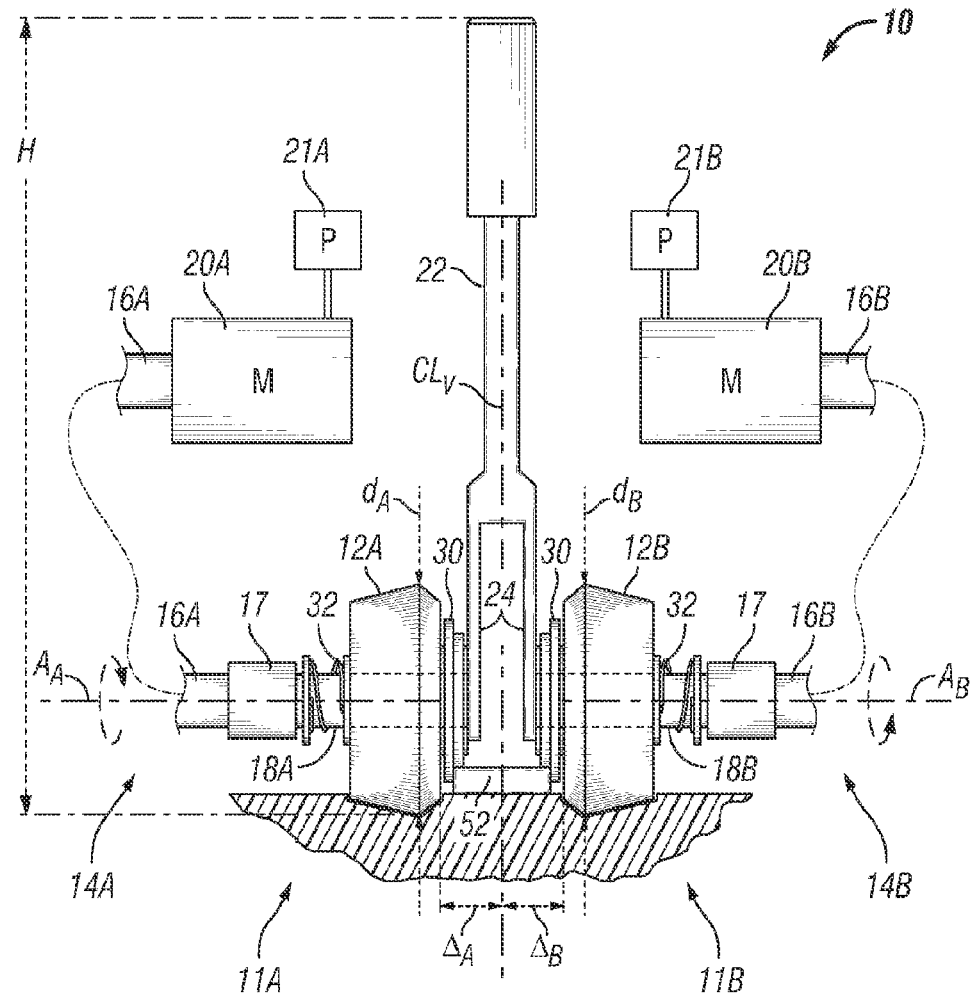
FIG. 1 is a front view of an abrading device engaging a tire surface, according to an exemplary embodiment of the invention.

Particular embodiments of the present invention provide an abrading device (or also referred to as "tool" herein) having a pair of abrading members (i.e., a dual head abrading tool) which counter-rotate to generally balance the abrading forces acting upon the tool and ultimately upon an operator as generated by the tool as the rotating abrading members engage a tire surface during abrading operations. The operator may comprise a user (i.e., a person) or a machine, where said machine may be automated or partially automated. When employing an abrading tool employing two or more rotating abrading members driven in the same direction, such rotation imparts significant forces upon an operator when translating the tool across a target surface. To generally offset or reduce these forces acting on a user or machine, the present invention provides oppositely rotating abrading members (e.g., abrading heads, disks, or wheels), where one rotates a first direction (e.g., clockwise) and the other rotates an opposite direction (e.g., counterclockwise) to balance the abrading forces during abrading operations. Abrading generally connotes grinding, buffing, or cutting operations, such as, for example, to remove material from an exposed tire surface. Particular embodiments of the present invention comprise methods for abrading a tire surface. In a more specific embodiment, the methods comprise abrading a tread of a tire in preparation for application of a new tread for retreading operations. In another specific embodiment, the methods comprise abrading an interior surface for tire repair operations, and may further include forming a tire patch receiving area.

Such methods for abrading a tire surface may include the step of providing a tire having: a pair of beads spaced axially along a rotational axis of the tire; an outer exposed surface extending between each pair of beads, the outer or external exposed surface including a tread surface extending annularly about the rotational axis of the tire; and, an inner or interior exposed surface extending between each pair of beads and annularly about the rotational axis of the tire, the inner exposed surface being spaced from the outer surface by a thickness of the tire. Abrading operations may be performed on any surface of any desired tire being characterized by any shape, size, and design. In particular embodiments, the abrading operations are performed along an interior tire surface to prepare the tire surface for receiving a tire repair patch. Generally, tires have a torus shape, whereby an outer diameter of the torus is generally flat to form an annular tire tread. Along an inner diameter of the torus is an annular opening extending between the axially offset pair of beads. The annular opening provides access to an annular interior tire cavity, which forms a pressurization chamber when the tire is mounted on a rim. The tire surface lining the interior chamber is referred to herein as the interior tire surface. In order to prepare the interior tire surface for repair, an abrading tool is first inserted into the annular opening to ultimately access the interior cavity of the tire. Once in the interior cavity, the tool may be used to remove any material from the interior tire surface to prepare the tire for receiving a tire patch or any other repair material. In other embodiments, the tool may be used to abrade any other surface of the tire, including the tread area to prepare the tire for receipt of a new tread during retreading operations. During such operations, the tread is substantially removed to provide a tire carcass for receiving a new tread. In other embodiments, methods of abrading according to the methods and apparatus described herein may be performed on any surface associated of the tire, including any interior or exterior surface, or any other surface whether or not associated with a tire.

Such methods may further include the step of providing an abrading tool comprising: a pair of counter-rotating, driven abrading members, each of the abrading members having a rotational axis generally extending laterally across the tool, the abrading members being spaced apart in a lateral direction of the tool by a desired distance, each of the abrading members having an annular abrading surface, each of the abrading members being adapted to be driven by a driving source. In particular embodiments, each of the abrading members are operably arranged along a rotational shaft. In further embodiments, each rotational shaft is operably attached to a body. Various embodiment of the abrading tool are discussed further below with specific reference to the exemplary figures provided herewith. It is understood that the figures provided and discussed are mere examples of any possible variation of an abrading tool within the scope of this invention, and are not exhaustive of other embodiments within the scope of the invention. Further, it is understood that the abrading tool (i.e., device) may form a hand tool (i.e., operated at least partially manually by a user) or a tool forming a portion of an automated or partially automated machine. In other variations, the tool described herein forms an attachment for a machine or tool, such as a rotating hand tool (which may be electrically or pneumatically driven, for example). In any event, the abrading members are adapted to be driven by a driving source, such as a motor, for example, that generates a driving force. Transmission of the driving force may be achieved by any transmission means known to one of ordinary skill in the art. For example, the transmission of driving forces may be achieved by rotational shafts (as generally shown in the figures), gears, or belts, or any combination thereof.

In particular embodiments, the abrading tool includes a pair of torque sensors, one sensor of each pair arranged at a particular location along a drive system associated one of the pair of abrading members and providing a sensor output signal that is a function of the torque operating at the particular location. In further embodiments, the abrading tool includes a pair of rotational speed sensors, one sensor of each pair arranged at a particular location along a drive system associated one of the pair of abrading members and providing a sensor output signal that is a function of the rotational speed operating at the particular location. A tool may include both a pair of torque sensors and a pair of rotational speed sensors. In particular variations, a torque sensor and/or a rotational speed sensor are provided to measure the corresponding torque and/or rotational speed, respectively, of an abrading member or of the rotational force being transmitted to the abrading member. Measuring the torque and/or rotational speed allows a user or operator to control or balance the forces generated by the rotation of the abrading members during abrading operations. These monitoring, measuring, and controlling operations may be performed manually or automatically by use of a controller comprising a processor and a memory storage device that stores instructions readable by the processor. A user may provide instructions or input during the operation of the tool, or the input or instructions may be predetermined and stored within a memory storage device prior to operation of the tool to provide an automatic operation in conjunction with a programmable logic controller. In particular embodiments, the abrading tool further comprises a differential arranged between the drive source and each of the abrading members. The differential may comprise any differential known to one of ordinary skill in the art, such as an open differential or a slip differential, for example. A brake a may also be arranged between the differential and each abrading member in particular embodiments to cause a faster abrading member to slow and thereby increase the torque supplied to each abrading member.

Such methods may further include the step of abrading material from an interior surface of a tire using the abrading tool. As discussed previously, in particular embodiments, the abrading tool is used to remove material from an interior tire surface, which generally comprises the tire surface extending between the beads and under the tread. However, the abrading tool may be useful for abrading other surfaces, including an exterior surface of a tire or a surface associated with any desired object.

Such methods may additionally include the steps of: receiving a signal from each of a sensor arranged at a particular location along a drive system of one of the pair of abrading members to measure torque, the signal being generated by the sensor as a function of the torque operating at the particular location; calculating a differential between the measured torque of each drive system; and adjusting instructions for adjusting the torque of one or more of the pair of drive sources to reduce the differential between the measured torque to a differential at or below a target maximum allowable torque differential if the calculated differential exceeds the target maximum allowable torque differential. One result desired is to reduce the forces acting on the tool and therefore on an operator during abrading operations. Therefore, a target maximum allowable (i.e., desirable) torque differential may be identified, where such may be stored within the computer readable memory or input by an operator. While in particular embodiments the target maximum allowable torque differential may be zero or near zero, in other embodiments the target maximum allowable torque differential may allow a minimal (i.e., small) amount of torque differential to exist that is acceptable to the user or operator. In response, to achieve a desired torque differential, the output rotational speed or power from an associated driving source is increased or decrease to obtain the desired target differential. Accordingly, in particular embodiments, these methods include a step of determining (or measuring) the contemporaneous torque of each abrading member or of any portion of the associated drive system, which may be based upon the received signal. In particular embodiments, these determined torques may be used to calculate the resultant differential in the step of calculating. The determined torques may also be used in the step of adjusting, whereby such torques may be increased or decreased to obtain a desired target differential. In particular embodiments, the steps of receiving a signal, calculating a differential, and adjusting the torque differential are performed automatically or semi-automatically by way of a programmable logic controller arranged in operable communication with the abrading tool. In the alternative, such steps are performed manually in whole or in part.

Such methods may further include the steps of: receiving a signal from each of a sensor arranged at a particular location along a drive system of one of the pair of abrading members to measure rotational speed, the signal being generated by the sensor as a function of the rotational speed operating at the particular location; calculating a differential between the measured rotational speed of each drive system; and adjusting instructions for adjusting the rotational speed of one or more of the pair of drive sources to reduce the differential between the measured rotational speed to a differential at or below a target maximum allowable rotational speed differential if the calculated differential exceeds a target maximum rotational speed differential. As stated previously, a desired result of the present invention is to reduce forces acting on the tool and therefore an operator during abrading operations. Therefore, a target maximum allowable (i.e., desirable) rotational speed differential may be identified, where such may be stored within the computer readable memory or input by an operator. While in particular embodiments the target maximum allowable rotational speed differential may be zero or near zero, other embodiments the target maximum allowable rotational speed differential may allow a minimal (i.e., a small) amount of rotational speed differential to exist that is acceptable to the user or operator. In response, to achieve a desired speed differential, the output rotational speed or power from an associated driving source is increased or decrease to obtain the desired target differential. Accordingly, in particular embodiments, these methods include a step of determining (or measuring) the contemporaneous rotational speed of each abrading member or of any portion of the associated drive system, which may be based upon the received signal. In particular embodiments, these determined speeds may be used to calculate the resultant differential in the step of calculating. The determined speeds may also be used in the step of adjusting, whereby such speeds may be increased or decreased to obtain a desired target differential. In particular embodiments, the steps of receiving a signal, calculating a differential, and adjusting the rotational speed differential are performed by way of a programmable logic controller arranged in operable communication with the abrading tool. Accordingly, the programmable logic controller may perform the steps automatically or semi-automatically. In other embodiments, in lieu of employing a programmable logic controller, these steps may be performed manually in whole or in part by user. In further embodiments, the step of adjusting the rotational speed includes causing a brake associated with a faster rotating abrading member to reduce the rotational speed of the faster rotating abrading member. Determining the faster rotating member may be performed by measuring the contemporaneous rotation of each abrading member and determining there from which abrading member is rotating faster. These steps may be performed within the step of calculating, or independent from the step of calculating. In lieu of using a brake, a slip differential or any other know differential may be employed to adjust the rotational speed of any abrading member.

Such methods may be employed for either manual or automated translation of the abrading tool. Exemplary embodiments of an abrading tool for use in performing such methods are discussed in further detail below.

Exemplary embodiments of an abrading tool 10 are shown in FIGS. 1-3A. The abrading tool 10 generally includes a pair of counter-rotating (i.e., oppositely rotating), driven abrading members 12A, 12B, each of the abrading members being in operational communication with a drive source. "Counter-rotating" as used herein means that the abrading members rotate in opposing or opposite directions. For example, while one of the abrading members rotates clockwise, the other abrading member rotates counter-clockwise. In the embodiment shown in FIG. 1, each of the abrading members 12A, 12B is in operational communication with a separate drive source 20A, 20B by way of separate corresponding drive shafts 16A, 16B. In other embodiments, each of the abrading members 12A, 12B are both in operational communication with a single drive source (which is contemplated by the exemplary embodiment shown in FIG. 3). It is understood that abrading tool 10 may be a hand tool for manual use by an operator, although a programmable logic controller (discussed below) may be employed to perform certain sensing and adjustment operations in conjunction with such manual operation. In other variations, abrading tool 10 may form a portion of a machine, which may be at least partially automated.

Figure 6:
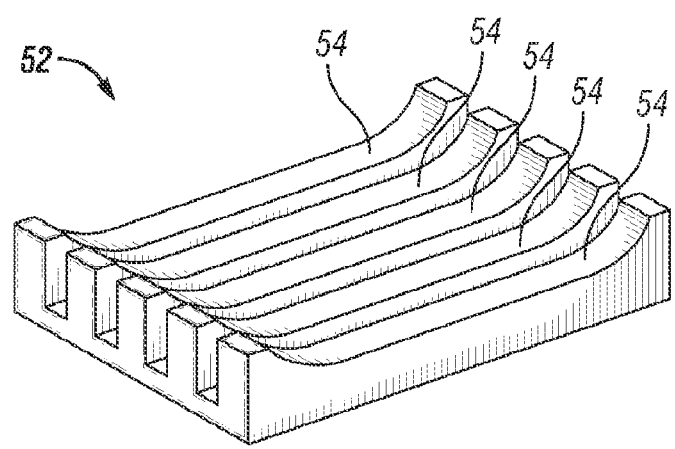
FIG. 6 is a front perspective view of an abrading template comprising a plurality of attached longitudinal members having a variable thickness and being laterally spaced to provide openings into which abrading members extend to engage a tire surface, according to an exemplary embodiment of the invention.

Abrading members 12A, 12B are generally annular in shape and may comprise any known member capable of abrading material from a surface during rotation of such abrading member. For example, abrading members may comprise a granulated material formed into an annular member such as a disk, which is generally represented by the abrading members shown in FIGS. 1-3A. By further example, abrading members may comprise an annular member 12 having a cutting member 13 protruding radially outward from the disk, such as is shown in FIGS. 6A-6B, for example. While the abrading member is generally annular in shape, any abrading member may comprise any annular shape capable of rotationally abrading operations. For example, abrading members may be cylindrical, conical, or frustoconical, where the central longitudinal axis of such shape operates as the rotational axis of the abrading member. Further, the outer abrading surface of any such abrading member 12A, 12B may extend axially in a linear (such as is shown in the figures) or a non-linear path. In particular embodiments, abrading members 12A, 12B have the same outer diameters $d_A$, $d_B$, respectively, at least initially in an unworn state. Accordingly, each abrading member has an abrading surface defined by at least one outer diameter, the abrading surface extending axially relative to the rotational axis of the abrading member. Each abrading member 12A, 12B is attached to the abrading tool 10 by any known means, such as by fasteners or by other known mechanical means, for example, and may be removeably attached to the abrading tool to facilitate replacement of worn or damaged abrading members.

Each drive source 20A, 20B may comprise any device known to one of ordinary skill that is capable of driving the rotation of abrading members 12A, 12B. Accordingly, each drive source 20A, 20B may generate any output (i.e., any driving force) capable of driving abrading members, and may operate by any known means. For example, abrading tool may employ an electric motor or a pneumatic motor generating a rotational output. In an effort to control material removal by abrading tool 10, drive source 20A, 20B may be capable of generating a desired rotational output, which may provide a desired torque and/or a desired rotational speed, or otherwise provide an output capable of driving any abrading member 12A, 12B to have a desired torque or rotational speed. Of course, the drive source type and output may comprise any device known to one having ordinary skill in the art. For example, the drive source may comprise an engine or a universal, DC, AC, synchronous or asynchronous, servo, electrostatic, torque, stepper, or linear motor, for example. Drive source is also in operable communication with a power source 21A, 21B, including electricity, combustible fuel, or compressed fluid or gas, for example.

Figure 3:
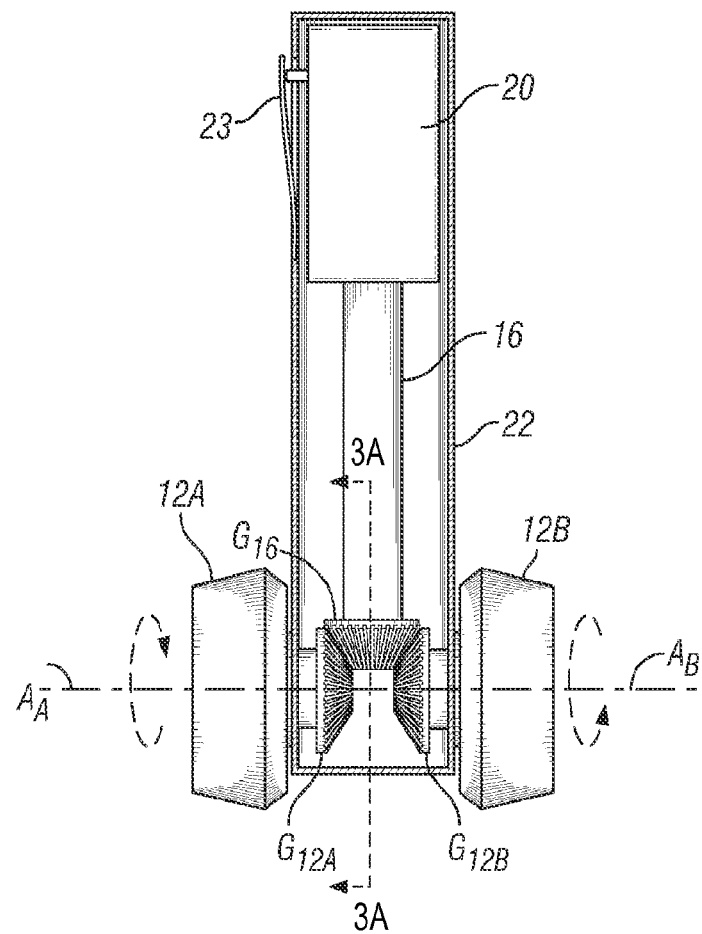
FIG. 3 is a front partial sectional view of an abrading device, according to a third exemplary embodiment of the invention.
Figure 3A:
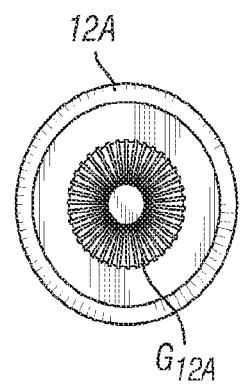
FIG. 3A is an inner side view of an abrading member with an associated gear of the abrading device of FIG. 3 as viewed outwardly from line 3A-3A of FIG. 3.

Operation of each drive source 20A, 20B, may be controlled manually by an operator or automatically by any means for controlling the drive source known to one of ordinary skill in the art. For example, manual operation may be achieved by use of a throttle that controls the speed and/or torque of a drive source. Such throttle may be located on the drive source 20A, 20B or on the tool, such as on tool body 22. For example, a throttle lever 23 is shown in the embodiment of FIG. 3, which is in operable communication with any known throttle mechanisms to control the speed and/or power of the drive source 120. Further, automatic control may be achieved by a programmable logic controller, for example, through the performance of particular instructions. Tool 10 may also include an on/off switch for controlling any such drive source.

Figure 2:
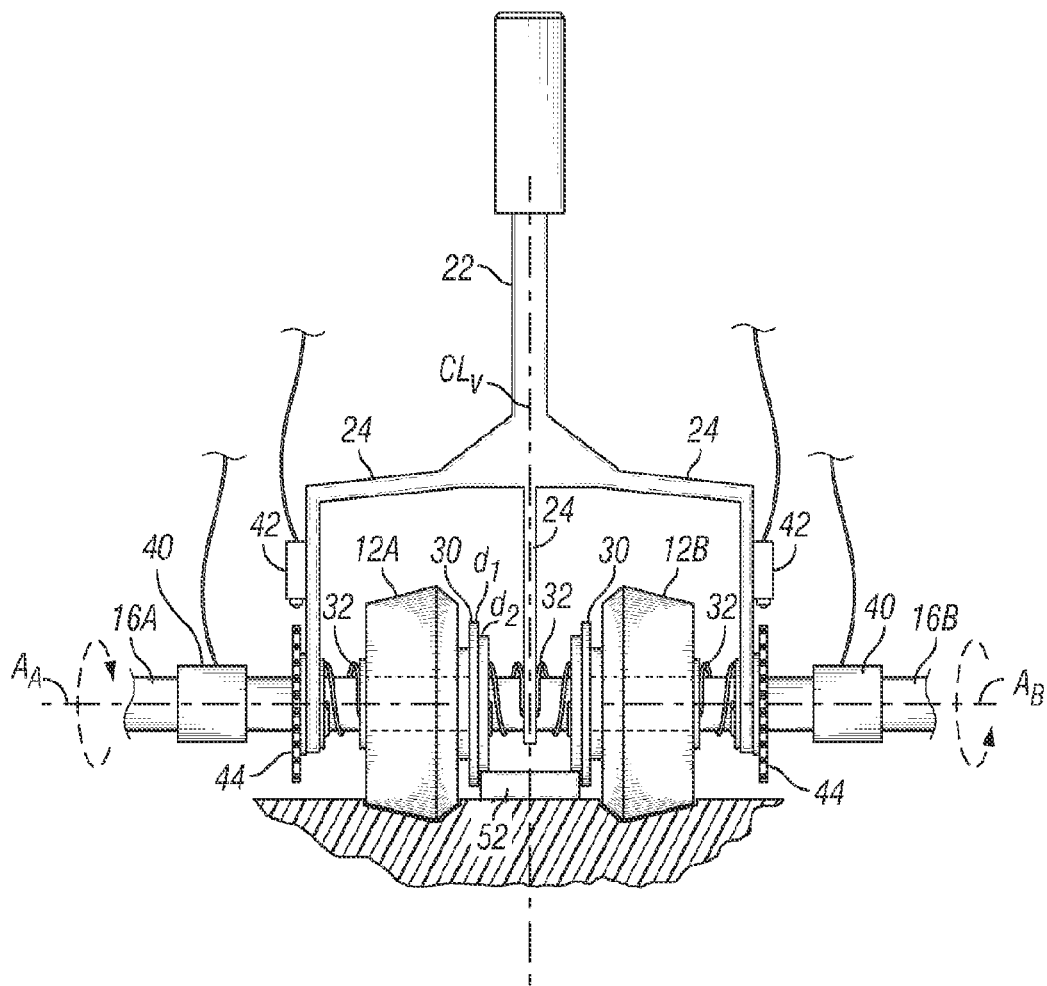
FIG. 2 is a front view of an abrading device according to a second exemplary embodiment of the invention.

With continued reference to FIGS. 1-2, drive shafts 16A, 16B transmit rotational power to each corresponding abrading member 12A, 12B. In the embodiment shown, the drive shafts are flexible drive shafts. Flexible drive shafts allow the tool 10 to more easily be arranged or manipulated into a desired position, such as within a tire, for example. Of course, in other embodiments a drive shaft may be rigid or inflexible (which is employed in the exemplary embodiment of FIG. 3). Each drive shaft 16A, 16B may be coupled directly to the abrading members 12A, 12B or may be coupled to, or otherwise be in operable communication with, a secondary drive shaft 18A, 18B upon which each abrading member 12A, 12B is attached. Coupling 17 may comprise any means for coupling rotational shafts known to one having ordinary skill in the art. As mentioned above, drive shafts are but one means for transmitting driving forces from a drive source. In other embodiments, any other means for transmitting driving forces from a drive source to an abrading member known to one of ordinary skill in the art may be employed, such as gears or belts, for example.

With general reference to FIGS. 1-2, tool 10 includes a body 22 to which abrading members 12A, 12B are rotationally attached and maintained in a desired arrangement. In the example shown, each abrading member 12A, 12B is fixedly mounted onto a shaft 18A, 18B, respectively, driven by a drive source 20A, 20B. Body 22 may be formed of any desired material to provide a generally rigid structure capable of retaining and guiding abrading members during abrading operations. To facilitate attachment of the abrading members to the body, one or more body legs or extensions 24 may extend from the body to which abrading members are rotationally attached. With reference to FIG. 1, a pair of body legs 24 are arranged centrally between the abrading members 12A, 12B. With reference to FIG. 2, a single leg 24 extends between abrading members 12A, 12B, while an additional leg 24 is arranged on the opposing side of each abrading member to provide additional support and rigidity. In particular embodiments, body 22 may be arranged for use as a hand tool for at least partial manual operation by a user. Further, body 22 include a means for attachment to hand tool, such as a rotary hand tool, or to an automated or partially automated machine. In other embodiments, body 22 may form at least a portion of, or be operably attached to, an automated or partially automated abrading machine.

To facilitate rotational attachment of each abrading member 12A, 12B to body 22, a bearing means 24 is arranged between body 22 and each shaft 18A, 18B. Bearing means may comprise any desired bearing known to one of ordinary skill in the art, such as plain or journal bearings, which may comprise a bushing, for example, rolling-element bearings, such as ball bearings, for example, fluid bearings, or magnetic bearings. Also friction lubricant such as grease or graphite, for example, may be employed as well. The bearing lubricant may be communicable via a fitting or the like such as a lubricant port.

Figure 1A:
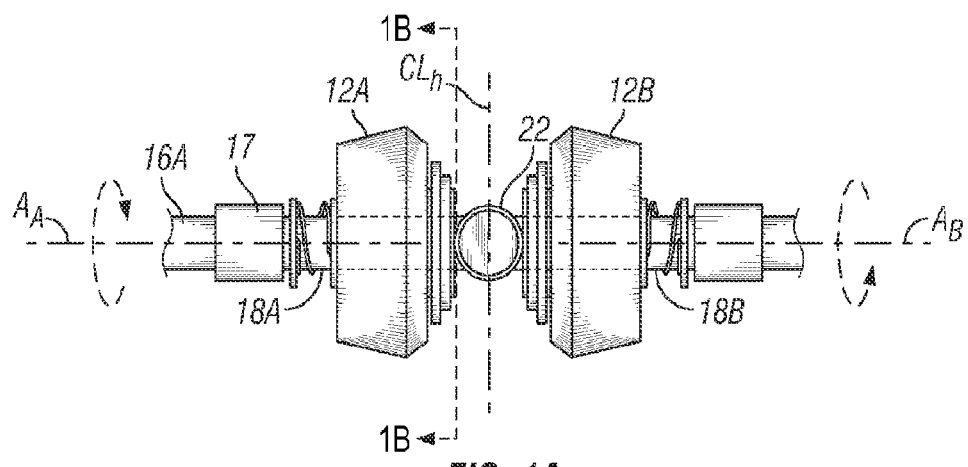
FIG. 1A is a top view of the abrading device of FIG. 1.

With reference to FIGS. 1-1A, abrading members 12A, 12B are arranged such that the rotational axis $A_A$, $A_B$ of each respective abrading member 12A, 12B intersect at vertical centerline $CL_v$ and horizontal centerline $CL_h$. Further, in such embodiment, axes $A_A$, $A_B$ are also coaxial. The arrangement of abrading members 12A, 12B can also be described as being normal to both a vertical centerline $CL_v$ and a horizontal centerline $CL_h$. Similar arrangements are shown in the embodiments of FIGS. 2 and 3. It is understood, however, in other embodiments, that rotational axes $A_A$, $A_B$ may be biased relative to each other such that the axes are not coaxial, and while still generally extending laterally across the tool. However, in such other embodiments, the rotational axes $A_A$, $A_B$ are similarly biased such that the axes continue to generally intersect along a plane defined by vertical centerline $CL_v$ and horizontal centerline $CL_h$. This also means that abrading members are also similarly spaced by distances $\Delta_A$ and $\Delta_B$, respectively, from centerline $CL_v$. By spacing each abrading member generally the same distance $\Delta_A$, $\Delta_B$ from vertical centerline $CL_v$, the torque (i.e., the moment) acting about the vertical centerline $CL_v$ is minimized during any abrading operation employing rotating abrading members 12A, 12B (or about any other rotational centerline, which is dependent upon the orientation of the tool). Further efforts to minimize this torque may be achieved by minimizing each distance $\Delta_A$, $\Delta_B$, as this will minimize the moment arm extending between each abrading member 12A, 12B and vertical centerline $CL_V$ (or any other applicable center of rotation). This torque is different than the torque being monitored and controlled by sensors 40, although any differential in torque and/or rotational speed of abrading members 12A, 12B will cause a torque about centerline $CL_v$.

Figure 8:
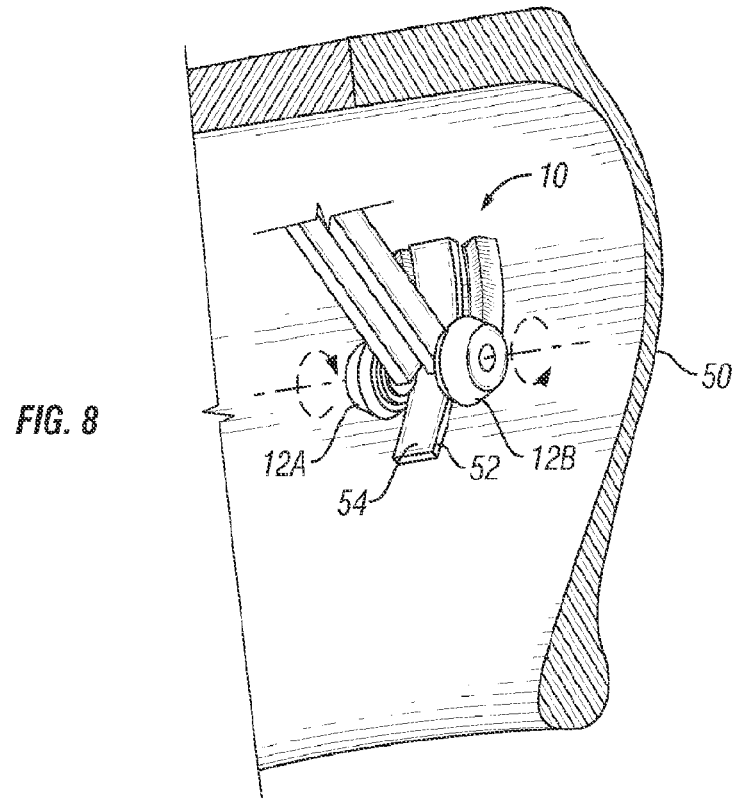

Tool 10 may also include one or more alignment and/or abrading depth guides for controlling the abrading operation of the tool along a target surface. For example, with generally reference to FIGS. 1 and 2, and with specific reference to FIG. 8, an abrading template 52 may be arranged along an interior tire surface 50 to control the translation and/or abrading depth of tool 10 in preparing the tire surface for tire patch application. To facilitate use of abrading template 52, tool 10 includes one or more guides 30 for engaging such template 52. By engaging template 52, each guide 30 directs the translation of the tool 10 and/or limits the depth to which tool 10 abrades the target surface. Template 52 may comprise any form capable of guiding tool in any desired path. For example, with reference to FIGS. 1, 2, 3, and 8, template 52 may comprise a single longitudinal member 54 having a desired thickness. By further example, with reference to FIG. 6, template 52 may comprise a plurality of attached longitudinal members 54. Template 52 and any longitudinal members 54 may have any desired thickness for controlling the abrading depth of tool 10.

Figure 1B:
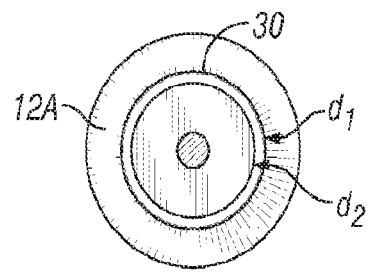
FIG. 1B is an inner side view of an abrading member with an associated guide of the abrading device of FIG. 1 as viewed outwardly from line 1B-1B of FIG. 1A.

Each abrading guide 30 may comprise a sliding surface or a rotating surface. For example, the sliding surface may form a surface of the body or a separate component attached to the body or any other desired component of the tool. By further example, the guide 30 may comprise a separately driven or freely rotating component having an outer surface that rotates along a template 52, such as is shown in FIGS. 1, 2, 3 and is referenced as element 30. In the embodiment shown, guide 30 is rotatably arranged along each shaft 18A, 18B. Guide 30 may be stepped, which allows each guide to maintain engagement and lateral or transverse alignment with an edge of template 52. A step, in other words, comprises a first surface 32 extending outwardly from guide 30 further than an adjacent second surface 34. In the exemplary embodiment generally shown in FIGS. 1, 2, 3, and more specifically shown in FIG. 1B, first surface comprises a cylinder having an outer diameter $d_1$ and the second surface comprising a cylinder having an outer diameter $d_2$, where outer diameter $d_1$ is greater than outer diameter $d_2$.

Although each guide 30 is shown arranged along a shaft 18A, 18B with a corresponding abrading member 12A, 12B, it is understood that each guide 30 may be arranged along any other shaft separate from shaft 18A, 18B having an abrading member and may be adjustable relative to the rotational axis of the abrading member and the outer surface of an abrading member for the purpose of adjusting the cutting depth of any abrading member. Further, it is understood that each guide 30 may be employed without use of any corresponding template 52, whereby each guide instead directly engages the target surface to be abraded in lieu of the template. While guides 30 may be arranged between and inward the inner ends of the abrading members 12A, 12B as generally shown in FIGS. 1, 2, and 3, additionally or in the alternative guides 30 may be arranged external to the outward end of each abrading member such that the abrading members are arranged between the external guides. External guides may also engage a template arranged along the target surface or may be arranged to directly engage the target surface. In any case, the arrangement of guide 30 relative to each abrading member 12A, 12B provides a desired cutting depth, which is defined by the additional distance each abrading member extends from shaft 18A, 18B relative to (or beyond) each guide 30. Each shaft 18A, 18B may include a means for adjusting the axial location of, or biasing, each guide 30 and each abrading member 12A, 12B along each corresponding shaft 18A, 18B. For example, with reference to FIGS. 1 and 2, means comprises one or more springs 32 arranged along each shaft 18A, 18B to allow each corresponding guide 30 and abrading member 12A, 12B the ability to translate along shaft 18A, 18B. Depending on its location, spring 30 may comprise a compression spring or a tension spring, where each spring 30 is arranged to force or bias each abrading member 12A, 12B and any desired abrading guide 30 axially inward along corresponding shafts 18A, 18B.

In particular embodiments, the torque and/or rotational speed of each abrading member 12A, 12B is measured and/or controlled. Torque and rotational speed may each be measured by any means known to one of ordinary skill in the art capable of measuring static or dynamic torque or rotational speed. Means for measuring static or dynamic torque is generally referred to herein as a torque sensor, which is represented by reference numeral 40 in FIG. 2. A variety of torque sensors are commercially available. For example, a torque sensor may employ: (1) torque transducers comprising a strain gauge bridge which may utilize Wheatstone bridge circuits and which may transmit electrical signals via slip rings, wireless telemetry, or rotary transformers for evaluation; or (2) pseudo-magnets formed of magnetoelastic material, where the magnetic field of such pseudo-magnet is monitored by a sensor to identify a change in the field upon torsional loading. The signal generated by any such torque sensor 40 is communicated to a user-interface 68 and/or a programmable logic controller (PLC) 60 (shown exemplarily in FIG. 7) for use in monitoring and/or controlling the torque of any corresponding abrading member 12A, 12B or drive source 20A, 20B.

Means for measuring rotational speed is generally referred herein as a rotational speed sensor or more simply as a speed sensor. A variety of speed sensors (also known as rotary sensors) 42 are commercially available, any of which may be employed in this invention. For example, a speed sensor may employ a magnetic sensor, pulse generator, an optical sensor, or other encoder that indicates or identifies when a shaft has rotated a predetermined distance (i.e., records or generates a signal identifying the angular position of shaft or any rotor mounted thereon at a corresponding to time). In these examples, the predetermined angular or rotational distance may be defined by magnets, gear teeth, or light sources arranged along a disk, gear, or other rotor 44 arranged along the rotatable shaft. By knowing how long it takes the shaft to rotate the predetermined distance, the rotational speed may be determined. It also noted that commercially available speed sensors 42 may additionally include a torque sensor 40.

A torque sensor 40 and/or rotational sensor 42 may each be arranged to measure the corresponding torque or rotational speed of each abrading member 12A, 12B. In particular embodiments, any sensor 40, 42 is in operational communication with each abrading member 12A, 12B. Accordingly, any such sensor may be arranged to be in direct communication with an abrading member 12A, 12B or arranged along any component that is in operable communication with abrading member 12A, 12B, including shafts 18A, 18B, respectively, for example. By further example, a sensor 40, 42 may be arranged along any component of the drive system associated with an abrading member 12A, 12B, where the 14A, 14B drive system includes a corresponding drive source 20A, 20B and one or more drive shafts which, in combination, extend between the abrading member and the motor. In the embodiment shown in FIGS. 1-2, the one or more drive shafts include drive shafts 16A, 16B, and shafts 18A, 18B, for example.

In particular embodiments, to compare torque or rotational speed measurements associated with opposing abrading members 12A, 12B and their associated drive systems, a pair of torque sensors 40 and/or a pair of speed sensors 42 are arranged such that one sensor of each such pair is arranged to take corresponding measurements associated with one of the abrading members 12A, 12B and/or an associated drive system while the other of each such pair is arranged to take corresponding measurements associated with the other of the abrading members 12A, 12B and/or its associated drive system. In particular instances, each sensor of a sensor pair is arranged at the same or similar position relative to the abrading member 12A, 12B or along each drive system 14A, 14B. Therefore, each corresponding torque sensor 40 and each corresponding speed sensor 42 is measuring the torque or rotational speed at the same location along each drive system 14A, 14B to provide a more accurate comparison between the local torque and local speed measurements operating along each subsystem 11A, 11B (where each subsystem comprises a corresponding abrading member and a drive system). For example, this may be useful when desiring to control a torque or rotational speed differential between abrading members 12A, 12B.

Figure 7:
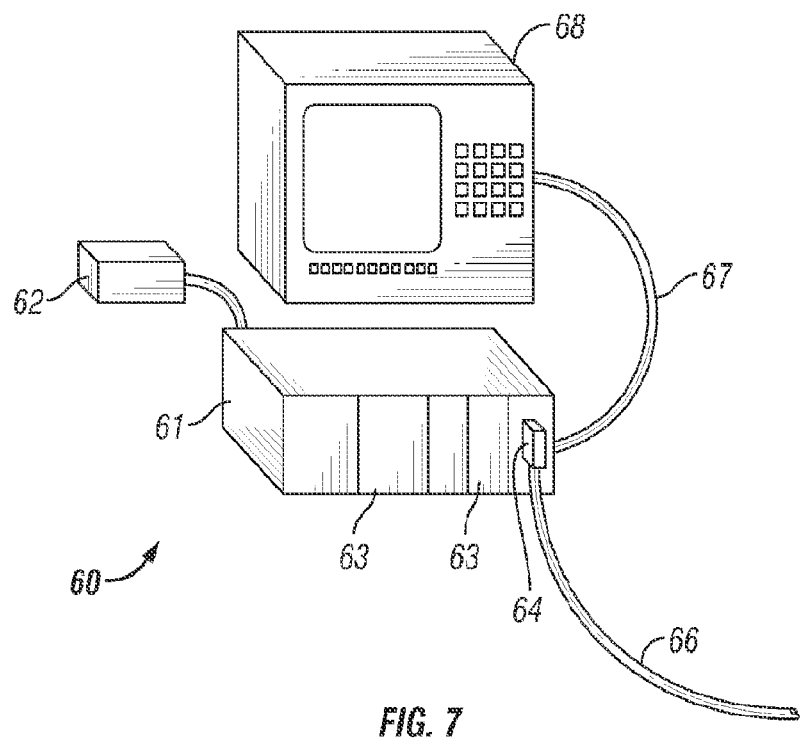
FIG. 7 is a front perspective view of a programmable logic controller for operable connection with any device and any drive source, power source, and/or sensor of the device, according to an exemplary embodiment of the invention; and, FIG. 8 is a front perspective view of the abrading device of FIG. 1 arranged along an abrading template to abrade material from an interior tire surface, where only a section of the annular tire is shown, according to an embodiment of the invention.

Each sensor 40, 42 generates a signal that may be sent to a user interface 68 for viewing by a user and/or for use by a programmable logic controller (PLC) 60 (exemplarily shown in FIG. 7). Upon review, a user may provide input or instructions for a PLC to adjust the output of any drive source 20A, 20B to adjust the torque and/or rotational speed of a corresponding abrading member 12A, 12B. Likewise, in lieu of a user first reviewing the measured torque or rotational speed, a PLC may automatically evaluate the received signals to determine, according to pre-existing instructions, which may include previously provided user-defined instructions and/or input, whether to adjust the output of any drive source 20A, 20B to arrive at a desired measured torque and/or rotational speed.

Programmable logic controller 60 may also include instructions to compare the measured torque of any pair of sensors 40 or the measured rotational speed of any pair of sensors 42. Once determining a differential in torque between a pair of sensors 40 or in rotational speed between a pair of sensors 42, the output of an associated drive source 20A, 20B may be adjusted (1) automatically by way of instructions performed by the PLC 60 or (2) manually by a user. In particular embodiments, a desired maximum torque differential or an approximately zero torque differential (i.e., zero to near zero torque differential) is maintained between abrading members 12A, 12B to provide a desired torque differential or minimum torque differential there between. In other embodiments, a desired maximum rotational speed differential or an approximately zero rotational speed differential (i.e., zero to near zero torque differential) is maintained between abrading members 12A, 12B to provide a desired rotational speed differential or minimum rotational speed differential there between.

With reference to an exemplary embodiment shown in FIG. 7, programmable logic controller 60 includes a logic processor 61, which may be a microprocessor, a memory storage device 62, such as RAM (random access memory), ROM (read-only memory), PROM (programmable read-only memory), and at least one input/output (I/O) cable 66 for communicating with tool 10. Further, PLC 60 may include an I/O slot 63 for housing an I/O card having I/O cable connector 67. PLC 60 may be programmed by any known graphical or text language. Programmed instructions, data, input, and output may be stored in a memory storage device 62, which is accessible to processor 61. Memory storage device 62 also stores inputs, outputs, and other information, such as, for example, sensor readings for torque and/or rotational speed, for use by processor 61 in performing its operations. Memory device 62 may comprise any commercially known storage device, such as such as hard disk drives, optical storage devices, flash memory, and the like. Processor 61 executes programmed instructions and may perform the distance and/or positional calculations and measurements, as well as other operations, discussed herein. An operator may utilize a user-interface 68 to monitor the sensors and to program, or otherwise control or instruct, the operation of controller 60 and tool 10, which includes performing each step and method in accordance with this invention. User-interface 68 and controller 60 may communicate by way of I/O cable 67. It is also contemplated that wireless communications may exist between controller 60, user-interface 68, and tool 10.

In an alternative embodiment, the pair of abrading members is driven by a single power source. With reference to FIG. 3, an exemplary embodiment of an alternative abrading tool 10 is generally shown having a single drive source 20 driving a drive shaft 16 to drive the pair of counter-rotating abrading members 12A, 12B. In the exemplary embodiment, drive shaft 16 includes a drive gear $G_{16}$ operably engaged with both a first abrading member gear $G_{12A}$ and a second abrading member gear $G_{12B}$. First gear $G_{12A}$ drives first abrading member 12A (shown in a side view in FIG. 3A) while second gear $G_{12B}$ drives second abrading member 12B. In the particular embodiment shown, first gear $G_{12A}$ is arranged coaxially with abrading member 12A, and may either be attached to a terminal end of abrading member 12A or attached to a shaft 18A upon which abrading member 12A is also attached. Further, first gear $G_{12B}$ is arranged coaxially with abrading member 12B, and may either be attached to a terminal end of abrading member 12B or attached to a shaft 18B upon which abrading member 12B is also attached.

In the embodiment shown, each gear $G_{16}$, $G_{12A}$, $G_{12B}$ is a pinion or a bevel gear, and the teeth arranged there along are straight teeth extending radially outward relative to the rotational axis of the gear. In other embodiments, each gear may comprise any other gear known to one of ordinary skill in the art, including spur and hypoid gears, for example. Further, any gear employed may include any type of teeth, including straight-cut teeth, helical teeth, or spiral teeth, for example. In addition to the gears $G_{16}$, $G_{12A}$, $G_{12B}$ shown, additional gears may be employed, including reduction gears, for example. Finally, it is understood that other means of transmitting driving forces may be employed to transfer drive forces to the abrading members 12A, 12B, such as belts or chain and sprockets, for example. A clutch may also me employed to cause a transfer or an interruption in the transfer of drive forces to the abrading members 12A, 12B. In the embodiments shown, drive source 20 may comprise any means of generating a driving force as discussed in connection with drive sources 20A, 20B. It is contemplated that the pair of abrading members with gears as shown in FIG. 3 may be separable from the motor and form an attachment to a hand tool. For example, the attachment may form an attachment to a rotational pneumatic hand tool, the tool including a pneumatic motor.

Figure 4:
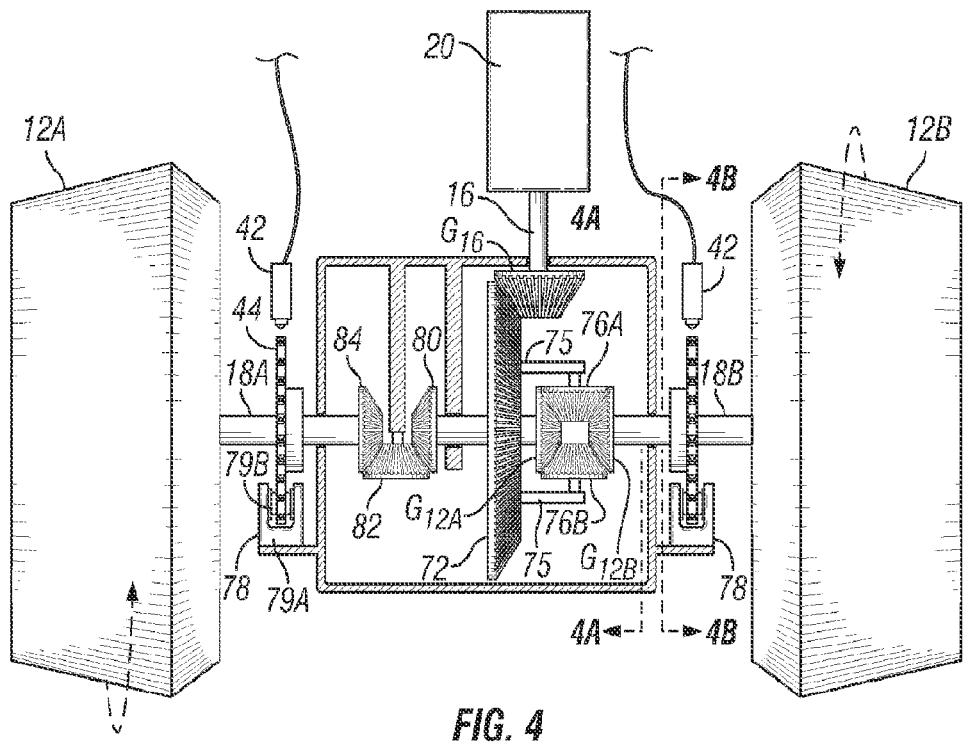
FIG. 4 is a front partial sectional view of an abrading device having a differential, according to a fourth exemplary embodiment of the invention.
Figure 4A:
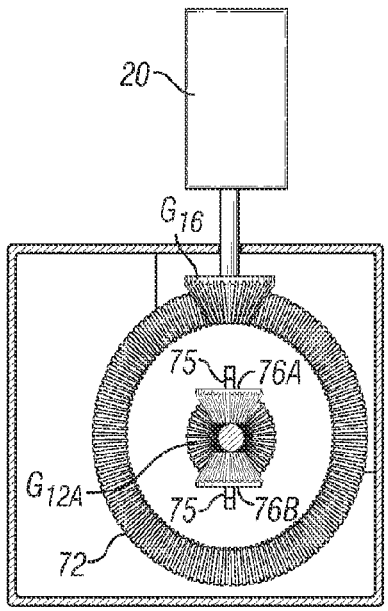
FIG. 4A is a partial sectional side view of the differential gears taken along line 4A-4A in FIG. 4.

Because the embodiment described in association with FIG. 3 does not include any means for adjusting the torque or rotational speed of one abrading member relative to the other, a differential with a braking means may be provided as exemplarily shown in FIG. 4. In one alternative embodiment, drive shaft 16 with drive gear $G_{16}$ engages a differential generally referred to as element 70. Differential 70 is an open differential and generally includes a driven ring gear 72 having a cage 74 fixed along the ring gear. Cage 74 includes a pair of opposing pinion gears 76A, 76B each arranged along a fixed support 75. Cage 74 is arranged along a central portion of ring gear 72 such that opposing first abrading member gear $G_{12A}$ and second abrading member gear $G_{12B}$ are arranged between each of the cage pinion gears 76A, 76B. FIG. 4A provides a side view of cage 74 in association with gears 72 and $G_{12A}$ for further clarity.

Figure 4B:
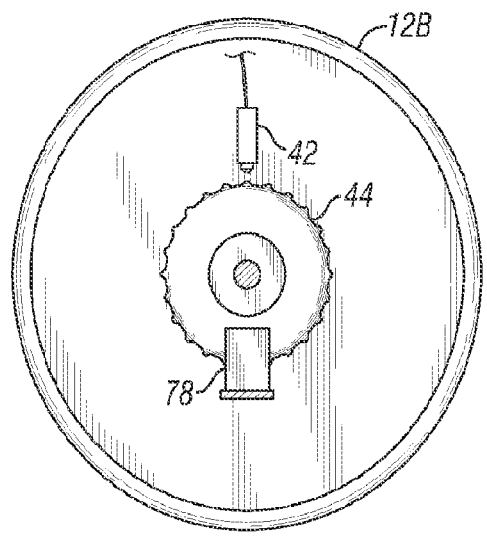
FIG. 4B is a partial sectional side view of the brake and speed sensor taken along line 4B-4B of FIG. 4.
Figure 5A:
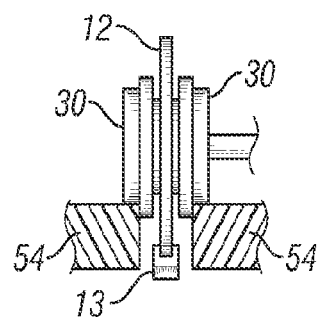
FIG. 5A is a front view of an abrading member comprising a cutting blade extending from an annular member, the abrading member being arranged with guides along the abrading template of FIG. 6, according to an embodiment of the invention.
Figure 5B:
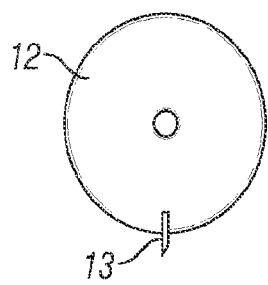
FIG. 5B is a side view of the abrading member of FIG. 5A.

In the embodiment shown, the output shaft of 73 of ring gear 72 rotates in the same direction as shaft 18B. To provide counter-rotating abrading members 12A, 12B, a means for counter-rotating shaft 18A is provided. In the embodiment shown, the means for counter-rotating shaft 18A relative to shaft 18B includes a pinion gear 80 mounted to shaft 73, the pinion gear 80 arranged to engage an intermediate step gear 82 comprising a second pinion gear which in turn engages a gear 84 mounted along shaft 18A to thereby cause shaft 18A to rotate in a direction opposite to the rotation direction of shaft 18B. It is understood, in the alternative, that any other means for counter-rotating abrading members 12A, 12B known to one of ordinary skill in the art may be employed. Further, it is understood that the embodiments shown in the FIGS. 3, 4-4B are only examples of an arrangement of gears providing counter-rotating abrading members 12A, 12B, and it is understood that any other arrangement of gears or other means for rotating abrading members known to one of ordinary skill may be employed.

In operation, as ring gear 72 is driven, cage 74 rotates with the ring gear. This causes both abrading member gears $G_{12A}$, $G_{12B}$ to rotate in the same direction with the ring gear 72, while the pinion gears 76A, 76B of cage 74 allow member gears $G_{12A}$, $G_{12B}$ to rotate at different speeds but at the same torque. Ultimately, gear $G_{12A}$ drives gear 84 in an opposite direction by way of gears 80, 82 but at the same torque and speed unless the design of gears 80, 82 is altered to provide otherwise (or unless additional gears are employed to reduce or increase torque or rotational speed. Therefore, when the situation arises where one of the abrading members 12A, 12B is rotating faster than the other, a brake 78 is employed to slow the faster rotating abrading member. This allows the torque to increase, which may be helpful improve the abrading operation and capabilities of the slower rotating abrading member. Any known means of braking known to one of ordinary skill may be employed. By example, brakes 78 may comprise a caliper 79A that actuates one or more brake pads 79B to engage or disengage a braking disk. Such a disk may comprise any known disk or rotor for engaging pads 79B, and may comprise disk 44 associated with speed sensor 42 or a disk independent of speed sensor 42. Caliper, pads, and disk may be formed of any desirable material. Braking means 78 may be controlled automatically by the PLC 60 and engaged when a desired rotational speed differential is reached and disengaged when a desired rotational speed differential is reached, where such desired differential may be zero, near zero, or any other desired difference in rotational speeds. In lieu of disengaging the brake upon reaching a desired rotational speed differential, the brake may be disengaged when a desired torque is reached. In other embodiments, the brake may be disengaged when reaching a desired torque differential between the abrading members 12A, 12B. The difference in rotational speeds may be determined by arranging a rotational speed sensor 42 (as generally discussed above) relative to each abrading member 12A, 12B to measure the rotational speed of the corresponding abrading member 12A, 12B or shaft 18A, 18B, for example. FIG. 4B provides a side view of the speed sensor 42 and brake 78 for further clarity. Torque may be measured by a torque sensor (as generally discussed above) arranged in association with a corresponding abrading member 12A, 12B. In the alternative, braking means may be manually operated. In lieu of using brake means, a limited slip differential employing clutches may be employed to ensure that driving torque is not lost when one abrading wheel undergoes increased rotational speed. It is understood that any means for allowing each abrading member to rotate at different speeds (also referred to as a "differential means") known to one of ordinary skill in the art may be employed in lieu of differential 70. Further, any known means for allowing each abrading member to be driven at different torques may be employed in lieu of the use of brakes or a slip differential.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. An abrading device forming a hand tool comprising:
a body;
a handle configured for at least a partial manual operation by a user to manually maneuver the abrading device to abrade an inner surface of a tire;
a pair of abrading members, each abrading member of the pair of abrading members is operably attached to the body and is configured to be driven to counter-rotate in relation to the other abrading member of the pair of abrading members, each of the abrading members having a rotational axis generally extending laterally in a lateral direction of the body such that the rotational axis of each of the pair of abrading members at least intersect, the abrading members being spaced apart in a lateral direction of the device by a desired distance, each of the abrading members having an annular abrading surface;

a means for adjusting the axial location of each abrading member; and, each of the abrading members being adapted to be driven by a single driving source, the single driving source being arranged in operable communication with each of the abrading members to transfer driving forces to each of the abrading members.

2. The abrading device of claim 1, wherein the rotational axis of each abrading member is arranged in mirrored relation to the rotational axis of the other abrading member relative to a centerline extending between the pair of abrading members, the centerline intersecting each rotational axis.

3. The abrading device of claim 1, wherein the driving source comprises a motor and a drive shaft in driven communication with the motor.

4. The abrading device of claim 1 further comprising:
a differential member arranged between the drive source and each of the abrading members.

5. The abrading device of claim 1 further comprising:
a guide member arranged co-axially with each abrading member and including at least one surface for engaging an abrading template, the means for adjusting the axial location of each abrading member also being configured to adjust the axial location of each guide member concurrently with adjustment of each abrading member.

6. The abrading device of claim 1 wherein the rotational axis of each of the pair of abrading members intersect at a vertical centerline and a horizontal centerline.

7. An abrading device forming a hand tool comprising:
a body;
a handle configured for at least a partial manual operation by a user to manually maneuver the abrading device to abrade an inner surface of a tire;
a pair of abrading members, each abrading member of the pair of abrading members is operably attached to the body and is configured to be driven to counter-rotate in relation to the other abrading member of the pair of abrading members, each of the abrading members having a rotational axis generally extending laterally in a lateral direction of the body such that the rotational axis of each of the pair of abrading members at least intersect, the abrading members being spaced apart in a lateral direction of the device by a desired distance, each of the abrading members having an annular abrading surface;
each of the abrading members being adapted to be driven by a single driving source, the single driving source being arranged in operable communication with each of the abrading members to transfer driving forces to each of the abrading members;
a pair of torque sensors, each sensor of the pair of torque sensors arranged at a particular location along a drive system associated with one of the pair of abrading members and providing a sensor output signal that is a function of a measured torque operating at the particular location along the drive system; and,
a controller comprising a processor and a memory storage device that stores instructions readable by the processor, including:
receiving instructions for receiving the sensor output signal from each sensor of the pair of torque sensors;
calculating instructions for calculating a differential between the measured torque of each abrading member as taken at each particular location along the drive system; and,
adjusting instructions for adjusting the torque of one or more of the pair of abrading members to reduce the differential between the measured torque to a differential at or below a target maximum allowable torque differential if the calculated differential exceeds the target maximum allowable torque differential.

8. An abrading device forming a hand tool comprising:
a body;
a handle configured for at least a partial manual operation by a user to manually maneuver the abrading device to abrade an inner surface of a tire;
a pair of abrading members, each abrading member of the pair of abrading members is operably attached to the body and is configured to be driven to counter-rotate in relation to the other abrading member of the pair of abrading members, each of the abrading members having a rotational axis generally extending laterally in a lateral direction of the body such that the rotational axis of each of the pair of abrading members at least intersect, the abrading members being spaced apart in a lateral direction of the device by a desired distance, each of the abrading members having an annular abrading surface;
each of the abrading members being adapted to be driven by a single driving source, the single driving source being arranged in operable communication with each of the abrading members to transfer driving forces to each of the abrading members;
a pair of rotational speed sensors, each sensor of the pair of rotational speed sensors arranged at a particular location along a drive system associated with one of the pair of abrading members and providing a sensor output signal that is a function of a measured rotational speed at the particular location along the drive system; and,
a controller comprising a processor and a memory storage device that stores instructions readable by the processor, including:
receiving instructions for receiving the sensor output signal from each sensor of the pair of rotational sensors;
calculating instructions for calculating a differential between the measured rotational speed of each drive system as taken at each particular location along the drive system; and,
adjusting instructions for adjusting the rotational speed of one or more of the pair of abrading members to reduce the differential between the measured rotational speed to a differential at or below a target maximum allowable rotational speed differential if the calculated differential exceeds the target maximum allowable rotational speed differential.

9. An abrading device forming a hand tool comprising:
a body;
a handle configured for at least a partial manual operation by a user to manually maneuver the abrading device to abrade an inner surface of a tire;
a pair of abrading members, each abrading member of the pair of abrading members is operably attached to the body and is configured to be driven to counter-rotate in relation to the other abrading member of the pair of abrading members, each of the abrading members having a rotational axis generally extending laterally in a lateral direction of the body such that the rotational axis of each of the pair of abrading members at least intersect, the abrading members being spaced apart in a lateral direction of the device by a desired distance, each of the abrading members having an annular abrading surface;
each of the abrading members being adapted to be driven by a single driving source, the single driving source being arranged in operable communication with each of the abrading members to transfer driving forces to each of the abrading members;

a differential member arranged between the drive source and each of the abrading members; and, a brake arranged between the differential member and each abrading member to control the rotational speed of each corresponding abrading member.

10. A method for abrading an inner surface of a tire, the method comprising the steps of:

providing a tire having: a pair of beads spaced axially along a rotational axis of the tire; an outer exposed surface extending between each of the pair of beads, the outer exposed surface including a tread surface extending annularly about the rotational axis of the tire; and, an inner or interior exposed surface extending between each pair of beads and annularly about the rotational axis of the tire, the inner exposed surface being spaced from the outer surface by a thickness of the tire;

providing an abrading device comprising: a pair of abrading members, each abrading member of the pair of abrading members configured to be driven to counter-rotate in relation to the other abrading member of the pair of abrading members, each of the abrading members having a rotational axis generally extending laterally across the device, the abrading members being spaced apart in a lateral direction of the device by a desired distance, each of the abrading members having an annular abrading surface, each of the abrading members being adapted to be driven by a single driving source, the single driving source being arranged in operable communication with each of the abrading members to transfer driving forces to each of the abrading members;

inserting the abrading device at least partially between the beads of the tire to engage the inner exposed surface of the tire with the pair of abrading members; and, abrading material from an interior surface of the tire using the abrading device for forming a tire patch receiving area along the tire inner exposed surface.

11. The method of claim 10 further comprising the steps of:

receiving a signal from each of a sensor arranged at a particular location along a drive system of one of the pair of abrading members to measure torque, the signal being generated by the sensor as a function of the torque operating at the particular location;

calculating a differential between a measured torque of each abrading member; and, adjusting the torque of one or more of the pair of abrading members to reduce the differential between the measured torque to a differential at or below a target maximum allowable torque differential if the calculated differential exceeds a target maximum torque differential.

12. The method of claim 11, wherein the steps of receiving a signal, calculating a differential, and adjusting the torque differential occur automatically by way of a programmable logic controller arranged in operable communication with the abrading device.

13. The method of claim 10, wherein the abrading device further comprises a differential member arranged between the drive source and each of the abrading members.

14. The method of claim 10 further comprising the steps of:

receiving a signal from each of a sensor arranged at a particular location along a drive system of one of the pair of abrading members to provide a measured rotational speed, the signal being generated by the sensor as a function of the rotational speed operating at the particular location;

calculating a differential between the measured rotational speed of each abrading member; and, adjusting the rotational speed of one or more of the pair of abrading members to reduce the differential between the measured rotational speed to a differential at or below a target maximum allowable rotational speed differential if the calculated differential exceeds a target maximum rotational speed differential.

15. The method of claim 14, wherein the steps of receiving a signal, calculating a differential, and adjusting the rotational speed differential occur automatically using a programmable logic controller.

16. The method of claim 14, wherein the steps of receiving a signal, calculating a differential, and adjusting the rotational speed differential occur automatically by way of a programmable logic controller arranged in operable communication with the abrading device.

17. The method of claim 14, wherein a brake is arranged between each abrading member of the pair of abrading members and a differential member arranged between the drive source and each abrading member of the pair of abrading members, and wherein the step of adjusting the rotational speed includes determining, from the step of calculating the differential, a faster rotating abrading member and subsequently causing the brake associated with the faster rotating abrading member to reduce the rotational speed of the faster rotating abrading member.

18. The method of claim 10, where each of the abrading members is configured to be driven by a single driving source, the single driving source being arranged in operable communication with each of the abrading members to transfer driving forces to each of the abrading members.

19. The method of claim 18, where the abrading device is a hand tool further including a body configured for at least a partial manual operation by a user to manually maneuver the abrading device to abrade the inner surface of the tire, where the pair of counter-rotating, driven abrading members are operably attached to the housing body and each of the abrading members having a rotational axis generally extending laterally in a lateral direction of the housing such that the rotational axis of each of the pair of abrading members at least intersect.

* * * * *